Patented Mar. 9, 1954

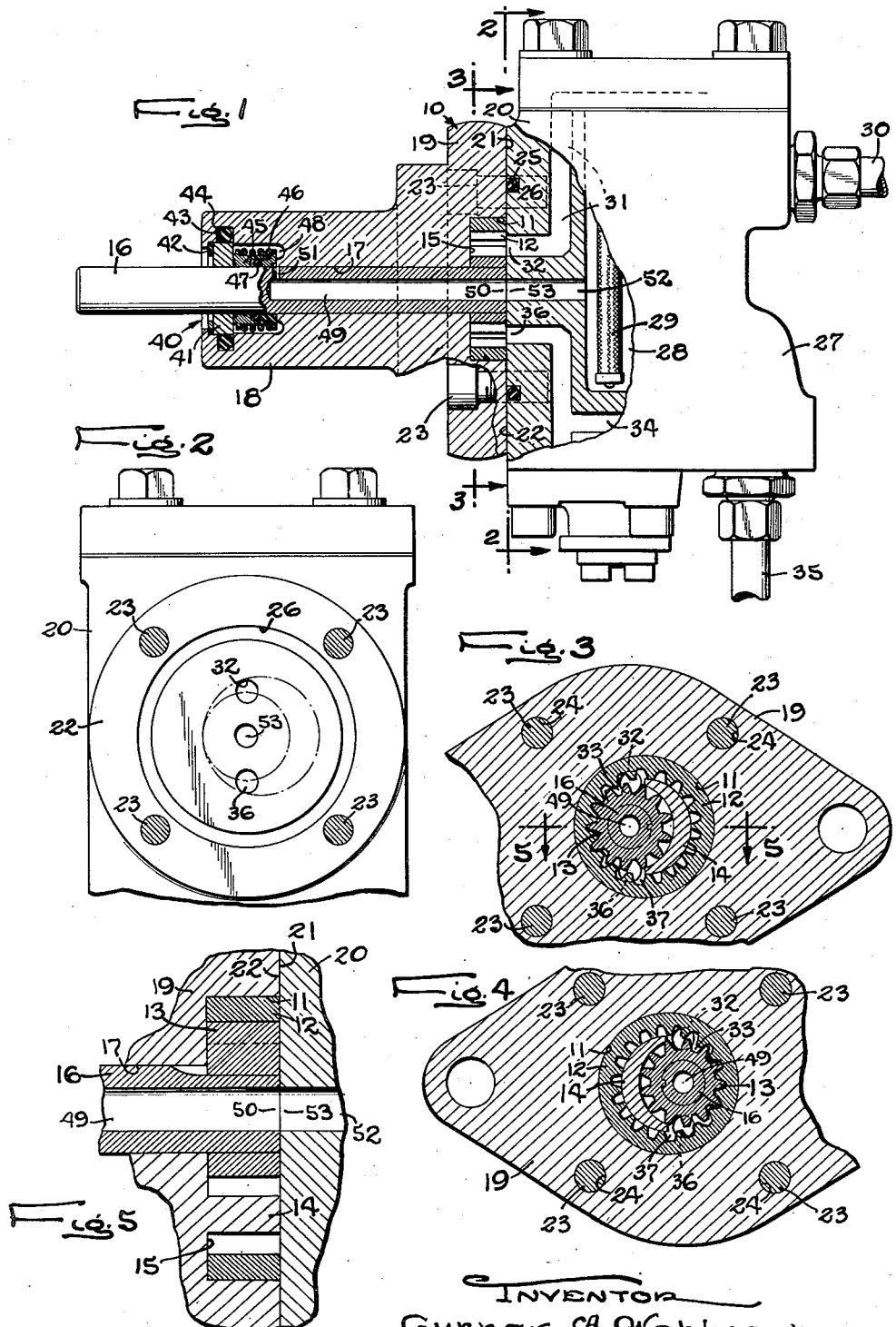

2,671,410

UNITED STATES PATENT OFFICE 2,671,410

GEAR PUMP

Gunnar A. Wahlmark, Rockford, Ill.

Application February 28, 1950, Serial No. 146,786

1 Claim. (Cl. 103—126)

This invention relates to gear pumps and in certain of its aspects to pumps in which a ring gear journaled in the pump casing has internal spur teeth meshing on one side with the teeth of a smaller pinion which is separated from the gear teeth on the other side by a crescent shaped member whose inner and outer concave and convex surfaces are in running contact with the teeth of the two gears.

The object of the invention is to construct the pump in a novel manner which facilitates rearrangement of the parts to adapt the pump for reverse rotation of the pump shaft without changing the location of the inlet and outlet ports.

Other objects and advantages of the invention will become apparent from the following detailed description taken in connection with the accompanying drawings, in which:

Figure 1 is an elevational view of a pump unit incorporating a pump embodying the novel features of the present invention, the pump and its drive shaft being broken away and shown in longitudinal section.

Fig. 2 is a fragmentary sectional view taken along the line 2—2 of Fig. 1.

Figs. 3 and 4 are fragmentary sections taken along the line 3—3 of Fig. 1 with one part of the pump casing disposed in different angular positions.

Fig. 5 is a fragmentary sectional view taken along the line 5—5 of Fig. 3.

The improved pump shown in the drawings for purposes of illustration comprises generally a two-part casing 10 defining a cylindrical recess 11 in which is journaled a ring gear 12 having internal spur teeth meshing on one side with the external teeth of a spur pinion 13 which is separated on the other side by a crescent-shaped member 14 rigid with one end wall 15 of the recess 11. The pinion is keyed or otherwise made fast on the inner end of a shaft 16 which projects outwardly through and is journaled in a bearing 17 within a hub extension 18 of the pump casing.

To carry out the present invention, the casing 10 is divided into two parts 19 and 20 preferably along the plane of the line 2—2 which is substantially coincident with the inner end surface of the ring gear 12 and the pinion 13. Herein, the casing part 19 is a casting in which the cylindrical recess 11 is machined accurately to a depth only slightly more, preferably to a depth of .001 of an inch, then the thickness of the pinion and the gear which thus abut at one end against the flat bottom 15 of the recess and are flush at the other end with a flat machined surface 21. The latter is clamped rigidly against a flat machined surface 22 which defines the other end wall of the gear recess. The clamping action is obtained by four screws 23 extending through holes 24 uniformly spaced around the casting 19 equidistant from the shaft 16 and threading into mating holes in the machined face of the casing part 20 which constitutes a cover for the recess 11. In such clamping, a ring 25 of oil resistant rubber is compressed in a circular groove 26 thus providing a fluid-tight seal between the casing parts when their surfaces 21 and 22 are drawn into full abutment. Herein, the casing cover 20 is formed on one side of a casting 27 which may include a chamber 28 having a filter 29 therein through which fluid entering through an inlet pipe 30 flows before entering the pump inlet passage 31. The latter terminates at the wall surface 22 in a port 32 which is disposed beyond one tip of the crescent member 14 and thus opens into a pocket 33 formed at the convergence of the peripheries of the pinion and ring gear. In a similar way, an outlet passage 34 leading to a pipe 35 is formed in the casing part 20 and originates at a port 36 which is disposed beyond the other tip of the crescent 14 and thus communicates with a pocket 37 defined between the diverging portions of the pinion and gear peripheries. The ports 32 and 36 are disposed along a diameter of the shaft 16 and equidistant from the shaft axis.

When the pinion 13 is rotated clockwise as viewed in Fig. 3, fluid from the filter chamber will be drawn through the inlet passage 31 and port 32 into the pump recess 11 and pocket 33 filling the spaces between the teeth of the pinion and the gear. The fluid bodies thus trapped are carried around the inner and outer surfaces of the crescent and forced out through the outlet port 36 and the passage 34 as they pass the far end of the crescent, and the teeth of the gear and pinion move into mesh.

Quiet operation by a minimum driving torque on the shaft 16 is achieved by constructing the casing 10 in the manner described above and also by forming the crescent member 14 in a novel manner to enable extremely close fits to be obtained in the final assembly around the exterior of the gear and between both concave and convex surfaces of the crescent and the ends of the opposed teeth on the pinion and the gear. To this end, the crescent is preferably cast integral with the end wall 15 of the pump casing, thus enabling the crescent surfaces and the recess to be machined accurately in precise relationship. This relationship is not disturbed in the assembly operation which simply involves driving of the screws 23 to bring the casing parts 19 and 20 into solid abutment, this being achieved without danger of distorting either of the casing parts.

Construction of the casing parts in the manner above described enables the parts to be adapted readily for operation by reverse rotation of the shaft 16 without changing the position of the inlet and outlet pipes 30 and 35. For this purpose, the casing parts are adapted for adjustment relative to each other about the axis of the shaft 16 into either of two positions which in the present instance are angularly spaced a half revolution apart to correspond to the spacing of the inlet and outlet ports 36 by joining the casing parts at the flat abutment surfaces 21 and 22 and by the uniform spacing of the screw holes 24 around the shaft.

By such adjustment, the crescent 14 may be located on the other side of the pinion 13 as shown in Fig. 4, thus reversing the relationship between the inlet and outlet ports 32 and 36 relative to the pockets 33 and 37 between the gears. It will be seen that each of the ports 32 and 36 has the same location relative to the meshing and unmeshing points of the gears in one of the two positions of the casing parts as the other port has in the other position of the casing parts. During counterclockwise rotation of the shaft, the gear teeth will pass out of mesh at the pocket 33 and opposite the inlet port 32 and into mesh opposite the outlet port 36. Thus, with the shaft turning in a direction opposite to that of Fig. 3, the fluid flows through the passages 31 and 34 in the same directions.

The outer end of the shaft bearing 17 is closed by a seal 40 which may be of any well known construction. Herein, it comprises a resin impregnated washer 41 of self-lubricating bearing material encircling the shaft 16 and held within the outer end of the hub 18 by a snap ring 42 and a ring 43 of oil resistant rubber compressed around the periphery of the washer and in an internal groove 44 in the hub. A collar 45 encircles the shaft inside of the washer and is urged by a spring 46 into rubbing contact with the inner end of the washer, the collar being secured to and sealed around the shaft by a rubber ring 47.

The shaft bearing 17 is lubricated by oil creeping outwardly along the shaft from the high pressure area of the pump recess 11. To permit of such gradual flow without danger of building up objectionable pressure in the chamber 48 adjacent the seal 40, provision is made for draining this chamber, and this without interfering with the reversibility of the pump as described above. For this purpose, a passage 49 is extended axially through the shaft from a port 50 at the inner end thereof to a cross-passage 51 which leads into the chamber 48. The passage 49 thus extends clear to the line of division between the two parts of the casing 10 thus permitting the passage to be drained through a passage 52 in the casing cover 20. This latter passage leads to the supply chamber 28 and terminates at a port 53 which registers with the port 50 when the casing parts are clamped together. Since the port 53 is alined with the axis about which the casing 19 is adjusted to reverse the pump as described above, the drain passage from the seal chamber 48 remains unbroken in both of the positions of adjustment of the pump casing.

I claim as my invention:

A pump having, in combination, a casing having a recess opening at a machined end surface, a cover having a flat surface lying against said first surface, means for clamping said casing to said cover in either of two positions in which the casing is angularly spaced approximately a half revolution about an axis extending through said recess normal to said surfaces, a shaft coaxial with said axis and projecting through a wall of said casing and into said recess toward said cover, a bearing formed solely in said casing and rotatably supporting said shaft to turn on said axis, intermeshing rotary gears in said recess defining a first fluid pocket between the converging peripheral portions of the gears on one side of said shaft and a second fluid pocket on the opposite side of the shaft between the diverging peripheral portions of the gears, one of said gears being journaled in said pump casing and the other gear being fast on said shaft, an inlet extending through said cover and terminating in a port which registers with a first one of said pockets in a first one of said positions and with the second pocket in the other position, and an outlet extending through said cover and terminating in a port which registers with said second pocket in said first position and with the first pocket in said other position, each of said ports in one of said casing positions having the same location relative to the meshing and unmeshing points of said gears as the other port has in the other of said casing positions.

GUNNAR A. WAHLMARK.

References Cited in the file of this patent

UNITED STATES PATENTS

| Number | Name | Date |
|---|---|---|
| 1,732,871 | Wilsey | Oct. 22, 1929 |
| 1,816,508 | Wilsey | July 28, 1931 |
| 1,840,867 | Rayburn et al. | Jan. 12, 1932 |
| 2,076,664 | Nichols | Apr. 13, 1937 |
| 2,107,152 | Huber | Feb. 1, 1938 |
| 2,148,561 | Kempton et al. | Feb. 28, 1939 |
| 2,151,482 | Keeson | Mar. 21, 1939 |
| 2,202,913 | Johnson | June 4, 1940 |
| 2,246,610 | Wagner | June 24, 1941 |
| 2,281,157 | Kanuch et al. | Apr. 28, 1942 |
| 2,420,622 | Roth et al. | May 13, 1947 |
| 2,458,678 | Bunte | Jan. 11, 1949 |
| 2,482,713 | Jones | Sept. 20, 1949 |
| 2,490,391 | Wentling | Dec. 6, 1949 |
| 2,513,984 | Witchger | July 4, 1950 |

FOREIGN PATENTS

| Number | Country | Date |
|---|---|---|
| 29,137 | Great Britain | of 1912 |